No. 651,841. Patented June 19, 1900.
C. E. FLEMMING.
MANUFACTURE OF BRUSHES.
(Application filed Oct. 1, 1896. Renewed Apr. 19, 1900.)
(No Model.) 2 Sheets—Sheet 1.
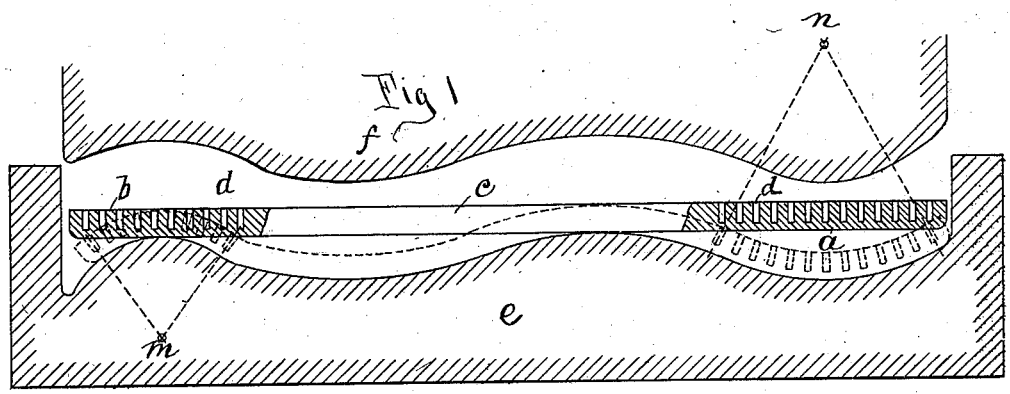
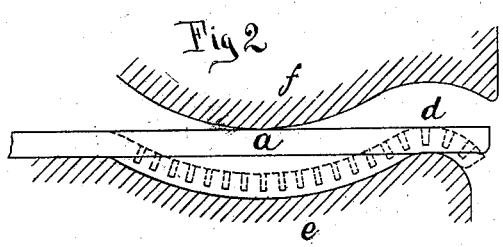 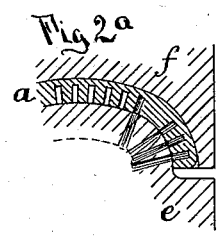
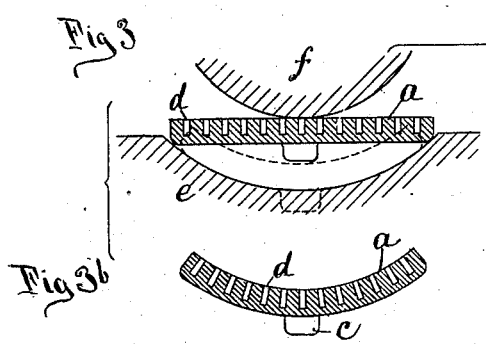 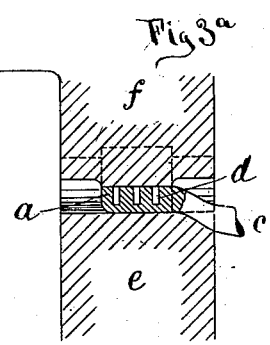
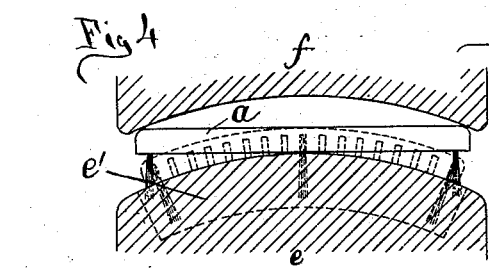 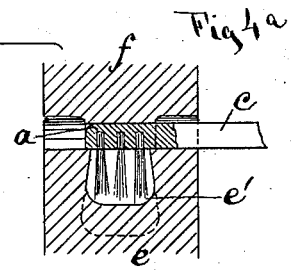
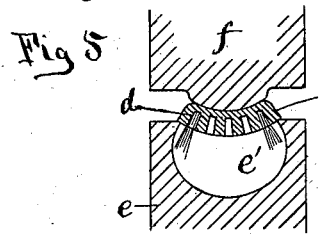
Witnesses,
M. F. Boyle
J. B. Clautice
Inventor,
Carl Edward Flemming
By Thomas Dyer Stetson
Attorney

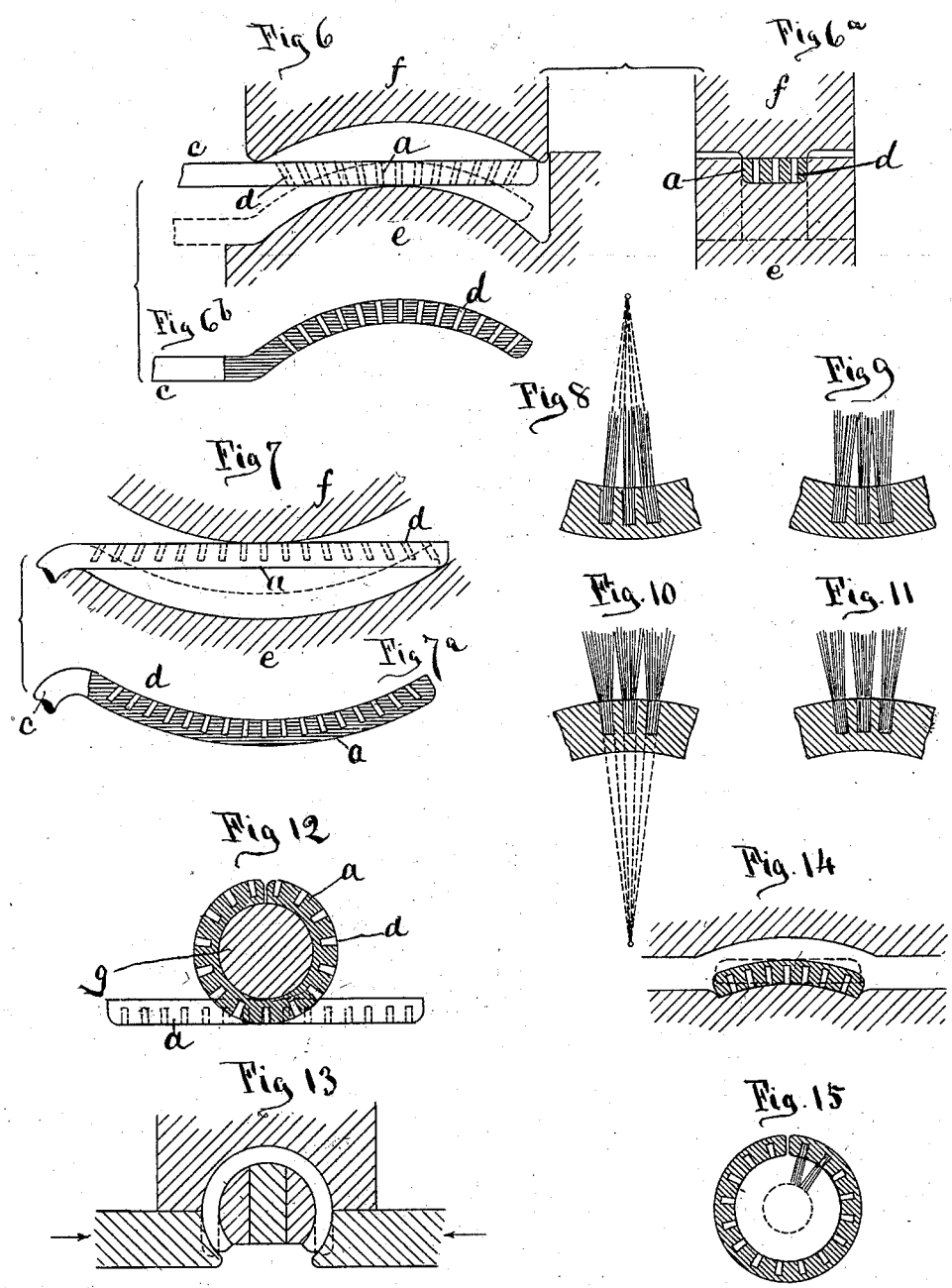

UNITED STATES PATENT OFFICE.

CARL EDUARD FLEMMING, OF SCHOENHEIDE, GERMANY.

MANUFACTURE OF BRUSHES.

SPECIFICATION forming part of Letters Patent No. 651,841, dated June 19, 1900.

Application filed October 1, 1896. Renewed April 19, 1900. Serial No. 13,517. (No model.)

*To all whom it may concern:*

Be it known that I, CARL EDUARD FLEMMING, a subject of the King of Saxony, residing at Schoenheide, Saxony, in the German Empire, have invented a certain new and useful Improvement in the Manufacture of Brushes, (which has been patented to me in Belgium, dated June 10, 1896, No. 121,862; in England, dated June 10, 1896, No. 12,766; in Germany, No. 89,322, dated January 10, 1896, and in Switzerland, No. 12,295, dated June 10, 1896,) of which the following is a specification.

In manufacturing brushes with curved backs heretofore the holes for the bristle-tufts have been prepared in such manner by boring or by punching that the brush-back and borer were required to be brought into the requisite relative positions for producing holes in the required positions. For this purpose more or less complicated machinery was required and disadvantages also arose in such methods that will be presently referred to.

The present invention relates to the production of bristle-holes in curved brush-backs of moldable material, such as celluloid, capable of being shaped under the action of heat and pressure, simple mechanism being used as for forming the holes in straight brush-backs. This is effected by forming the holes in the brush-backs while these are in a straight form and then bringing the backs into the required curved form and allowing them to harden either before or after the bristle-tufts have been inserted. In this method of operating it is immaterial whether the holes are formed entirely or only partially through the brush-back. The alteration of the positions of the holes caused by the subsequent change of form of the brush-back is of importance, as by this means the bristles of the tufts are either spread out or brought close together at their free ends, according as the back is bent into a concave or convex form. According to this method brushes of any desired curvature can be produced—such as brushes of a serpentine, spherical, ellipsoidal, cylindrical, or other curved form; also, hollow brushes—that is to say, backs presenting curved surfaces in which bristle-openings can be produced.

The method of manufacturing will be more clearly understood on reference to the accompanying drawings, in which—

Figure 1 is a longitudinal vertical section. Figs. 2, 2ª, 3, and 3ª are corresponding sections showing different forms of the parts and producing different forms of brushes. Fig. 3ᵇ is a section through the brush produced in Figs. 3 and 3ª. Fig. 4 is a longitudinal vertical section. Fig. 4ª is a corresponding section at right angles to Fig. 4. Fig. 5 is a vertical section showing another form. Fig. 6 represents a modification and is a vertical section showing a pair of dies open with a brush-blank in position. Fig. 6ª is a section at right angles thereto, showing the parts after the dies have closed. Fig. 6ᵇ is a section showing the completed brush-back. Fig. 7 represents another modification and is a section corresponding to Fig. 6, but adapted to curve the brush in the opposite direction. Fig. 7ª is a corresponding section of the complete back. Figs. 8, 9, 10, and 11 are sections of portions of a brush on a larger scale. Fig. 12 is a section showing one arrangement of cylindrical back. Fig. 13 is a vertical section illustrating the production of a brush-back approximately of semicylindrical form. Fig. 14 is a section showing the dies open and the brush-back in two conditions. Fig. 15 is a section showing a cylindrical brush-back adapted to present the brush on the inner face.

Similar letters of reference indicate corresponding parts in all the figures where they appear.

Fig. 1 shows, by way of example, the manufacture of a double tooth-brush which has at one end a convex brush-surface and at the other end a concave brush-surface. The two brush-backs *a* and *b* form, with their stem *c*, in the first place a straight bar in which the formation of the parallel bristle-holes *d* is readily effected. After these have been formed the brush-body is introduced into a mold composed of the parts *e* and *f* and is thereby molded into the shape indicated by the dotted lines. The bristle-holes are thus made to assume accurately the correct position. If, for example, the brush-backs are curved in the form of circular arcs, as indicated by the marked centers *m n*, then the bristle-holes will all receive radial positions.

My method allows the manufacture of brushes having the bristles converging, a condition which cannot otherwise be so conveniently attained. The novel brush thus produced may serve important uses.

Fig. 2 shows an example of the manufacture of a serpentine or partly convexly and partly concavely bent brush-body, and Fig. 2ª shows a brush the back of which is more bent at the end than at the middle. Figs. 3, 3ª, and 3ᵇ show a curved brush-back for a brush whose handle is out of the plane of the brush-surface. For all these constructions it is only necessary to employ devices for molding or shaping under pressure. The pressure can be effected either before or after the introduction of the bristles. The latter is shown at Figs. 4 and 4ª. In this case the one mold e lays hold of the brush-back only at the edges close to the bristles, which are then situated in a hollow e' of the mold. Fig. 5 shows a brush-back which is bent in the direction at right angles to the length after the introduction of the bristle-tufts. The brush-backs can also be bent in both directions—namely, both lengthwise, as at Figs. 1, 2, 3, and 4, and transversely, as at Fig. 5, and in the latter case either convexly or concavely.

If it be required to produce curved brushes in which the holes for the bristles shall converge or diverge otherwise than in a manner due to the curvature of the back, as indicated in Figs. 6ᵇ and 7, the bristle-holes are formed in corresponding oblique positions in the back before this is bent in the mold, as shown at Figs. 6 and 7. For these examples the holes diverge or converge already in the unbent brush-back, and by the bending such convergence or divergence may be considerably increased. The holes can also be so formed that they assume a position parallel to each other after bending the brush-back. Such brush-backs can in addition receive a convex or concave curvature in the transverse direction, as at Fig. 5.

As before stated, the bristle-holes of brushes prepared according to this invention, differ from the bristle-holes of ordinary brushes in that they experience a change of form on the bending of the brush-back, as their openings become contracted or expanded, according as the brush-back is bent convexly or concavely. By this means in the one case the bristles of the separate tufts are kept closer together and in the other case they are spread farther apart. This action is important for the production of a perfect brush-surface, as shown at Figs. 8 to 11. Fig. 8 shows part of a concave brush-surface formed according to the present invention, and Fig. 9 shows the same formed in the old manner. It is assumed that in both cases the bristle-tufts are at the same distance apart. In Fig. 8 the bristle-tufts in consequence of the convergence of the upper end of the holes are contracted the more together the more the brush-back is curved.

In the old construction, Fig. 9, the tufts penetrate one into the other, and thus afford a defective brush-surface.

With convexly-curved brush-surfaces, as at Fig. 10, the holes are expanded at their mouths, and in consequence thereof the ends of the tufts are spread out, which circumstance is very important in particular with long bristle-tufts. With brushes of ordinary construction, as at Fig. 11, there are produced spaces between the tufts if these are at the same distance apart as at Fig. 10. Thus it will be seen that by the above-described narrowing or widening of the bristle-holes on the curving of the brush-back there will always be produced a continuous perfect brush-surface if the distance between the holes be properly chosen.

Fig. 12 shows as a further example a carriage-brush in which the brush-back a, provided with holes while flat, is afterward bent either circular, oval, &c., either before or after insertion of the bristles. The bending is in this case advantageously effected upon a mandrel g.

Fig. 13 shows a brush-body presenting an exterior a little more than a semicylinder. The main portion of the exterior is shaped by a die having a semicylindrical cavity of the proper size. The remainder of the exterior is shaped by two dies, which are drawn toward each other by means not shown after the material of the brush-body is in place. The interior is formed by two cheeks with a wedge-shaped piece between them to facilitate removal. It will be understood that the holes for the bristles may be produced in any required number in the body before the bending. Fig. 14 is a brush of a domed form with the corresponding molds. In a similar manner ellipsoidal and other brushes with any desired longitudinal and cross section can be produced.

Fig. 15 shows an example of a hollow brush, a cylindrical brush, the interior of which is provided with a brush-surface. This brush is produced simply by bending around by means of suitable tools a flat brush-back, the length of which corresponds to the periphery of the cylinder, Fig. 15, and which has previously been provided with bristle-tufts in such manner that the latter are situated inside.

It will be evident that according to the above-described method a great variety of differently-formed brushes of hitherto-unknown configurations can be manufactured merely by employing suitable tools for molding brush-backs into the required shapes after these have had the bristle-holes formed in them while in the flat condition. This method also enables larger brushes—such as silk-hat brushes, carriage-brushes, &c.—to be manufactured in a simple and inexpensive manner and of the exact form required.

I claim as my invention—

1. That improvement in the art of manufacturing brushes which consists in forming a series of holes for bristle-tufts in a back of plastic material while said back is flat, and subsequently shaping said back into the desired curved form by the action of heat and pressure whereby the position of the holes for the bristle-tufts is changed, as described.

2. That improvement in the art of manufacturing brushes which consists in forming a series of holes for bristle-tufts in a back of plastic material while said back is flat, subsequently shaping said back into the desired curved form by the action of heat and pressure whereby the position of the holes for the bristle-tufts is changed, and introducing bristle-tufts and securing them within the holes, as described.

In testimony whereof I have hereunto set my hand, at Schoenheide, Saxony, Germany, this 25th day of August, 1896, in the presence of two subscribing witnesses.

CARL EDUARD FLEMMING.

Witnesses:
    THEODORE M. STEPHAN,
    EUGEN KLEMENZ.